United States Patent [19]

Flotow

[11] Patent Number: 5,601,171
[45] Date of Patent: Feb. 11, 1997

[54] BRACKET ASSEMBLY FOR TORQUE TRANSMITTING DEVICE

[75] Inventor: Richard A. Flotow, Butler, Ind.

[73] Assignee: Dana Corporation, Toledo, Ohio

[21] Appl. No.: 264,546

[22] Filed: Jun. 23, 1994

[51] Int. Cl.⁶ .................................................. F16D 13/68
[52] U.S. Cl. ..................... 192/70.13; 192/70.19; 192/107 R; 188/73.32
[58] Field of Search ........................... 192/70.13, 70.14, 192/70.19, 107 R, 115, DIG. 1; 411/111, 116, 121, 122, 372; 188/71.5, 73.2, 73.32

[56] References Cited

U.S. PATENT DOCUMENTS

| | | |
|---|---|---|
| 943,804 | 12/1909 | Baumgartner-Mica . |
| 1,233,561 | 7/1917 | Dornfeld ........................ 192/70.19 |
| 1,803,430 | 5/1931 | Hand . |
| 1,848,843 | 3/1932 | Ruesenberg ..................... 192/70.19 |
| 1,940,947 | 12/1933 | Hand . |
| 1,946,263 | 2/1934 | Bach ................................ 192/70.14 |
| 2,259,461 | 10/1941 | Eason . |
| 2,303,201 | 11/1942 | Eason . |
| 2,913,081 | 11/1959 | Rudisch . |
| 2,942,708 | 6/1960 | Eason . |
| 4,267,870 | 5/1981 | Warner ............................. 411/122 X |
| 4,298,112 | 11/1981 | Cartensen ........................ 192/70.13 X |

*Primary Examiner*—Richard M. Lorence
*Attorney, Agent, or Firm*—Dykema Gossett PLLC

[57] ABSTRACT

A friction torque transmitting device includes a flywheel and a housing, wherein a pressure plate and a driven plate are sandwiched between the housing and the flywheel. The driven plate is coupled to an axially extending drive shaft. A friction bracket assembly is secured to the torque transmitting device at an outer periphery by a pair of spaced dowels. The friction bracket assembly extends about a drive shaft for only a limited circumferential extent, so that each bracket of the assembly may be removed from the drive shaft without disassembly of the device. Each of the brackets include friction surfaces in order to frictionally engage the elements of the device. A forward bracket includes a guide member extending from the forward bracket that cooperates with another member of the device, such as the housing, to provide increased stability. A rearward bracket includes a guide member extending from the rearward bracket which cooperates with the forward bracket for increased stability. The guide members assist in maintaining the relative orientation of the brackets during axial movement.

5 Claims, 1 Drawing Sheet

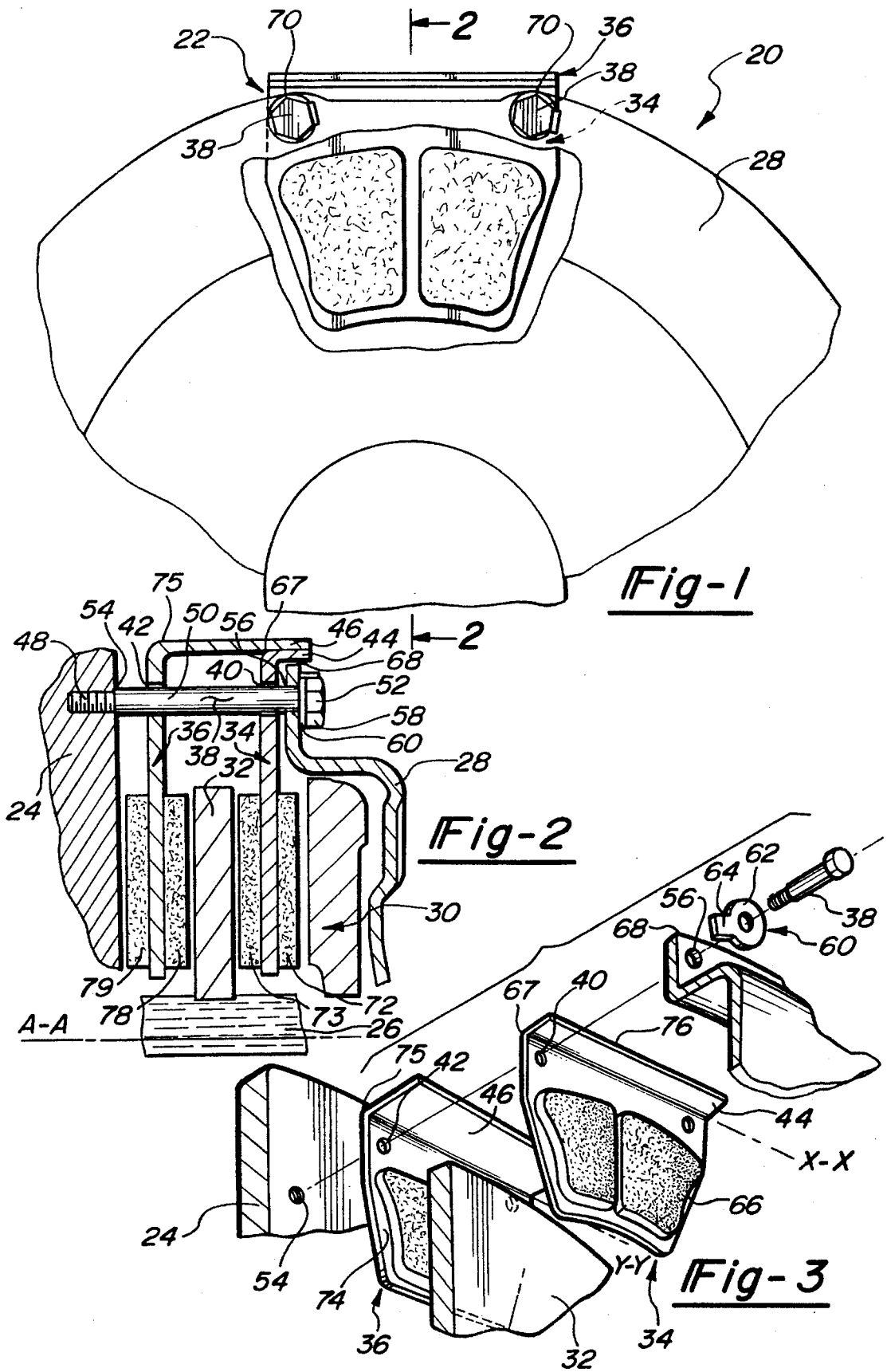

BRACKET ASSEMBLY FOR TORQUE TRANSMITTING DEVICE

FIELD OF THE INVENTION

The present invention relates to a torque transmitting device, and in particular, to a friction bracket assembly used in transmitting torque for the device.

BACKGROUND OF THE INVENTION

A torque transmitting device includes a driving member and a driven member. The driven member typically includes a friction surface that must be replaced during the life of the torque transmitting device as wear occurs to the friction surface.

The driven member of the torque transmitting device typically rotates about an axially extending drive shaft. In order to replace the friction surface of the driven member, the torque transmitting device must be disassembled. Replacing the friction surface in this manner is time consuming and expensive.

To accommodate easy replacement, it is known in the art to use a bracket that does not extend for the full circumferential extent of the drive shaft. The bracket, having a friction surface, may be removed from the drive shaft without disassembling the torque transmitting device. The bracket is typically secured to an outer peripheral portion of the torque transmitting device, as opposed to an inner peripheral portion. The bracket, supported only along the outer periphery, extends radially inwardly towards the drive shaft.

It is known in the art to attach the bracket to the driving member by use of axially extending dowels. The dowels extend through apertures in the bracket, and bracket slides axially along the dowels. During operation of the torque transmitting device, the bracket slides axially with respect to the drive shaft when the driving member and driven member are engaged and disengaged.

If the diameter of the aperture in the bracket and the dowel are in close tolerance, the bracket may bind as it is moved axially. If a greater tolerance is provided, the bracket may not maintain proper alignment during axial movement. Properly supporting the bracket for movement in the axial direction is difficult due to the limited support structure. In addition, movement of the bracket is often unstable due to centrifugal forces acting on the bracket. Consequently, the torque transmitting device operates less efficiently. Further, the prior art bracket is subject to vibration or "chatter," particularly at high rotational speeds. Such vibration results in undesirable noise.

It is therefore a goal of the present invention to provide an easily removable bracket having a friction surface for use in a torque transmitting device, wherein the bracket is attached to an outer periphery of the device and is provided with a guide member for additional support during axial movement. A further goal of the invention is to provide the bracket with a guide member that cooperates with another element of the torque transmitting device, such as a housing or cover. A further goal of the present invention is to provide a friction bracket assembly having smooth operation and reduced noise.

SUMMARY OF THE INVENTION

A friction torque device includes a driving member and a housing, wherein a pressure plate and a driven member are sandwiched between the housing and the driving member. The torque device further includes a bracket assembly comprised of a pair of brackets, each bracket including a friction surface on opposed surfaces of the bracket. A pair of dowels extends axially from an outer periphery of the driving member, and extend through apertures in the brackets. The brackets slide axially along the dowels, and extend about a drive shaft for only a limited circumferential extent. A forward bracket includes an axially extending guide member that cooperates with the housing to provide increased stability. A rearward bracket includes an axially extending guide member that cooperates with the forward bracket for increased stability. The guide members assist in maintaining the relative orientation of the brackets during axial movement.

These and other features of the present invention can be best understood from the following specification and drawings, of which the following is a brief description.

BRIEF DESCRIPTION OF THE DRAWINGS

FIG. 1 is a fragmented planar view of a torque transmitting device including a friction bracket assembly according to the present invention. lines 2—2 of FIG. 1.

FIG. 3 is an exploded fragmentary perspective view of the torque transmitting device of the present invention.

DETAILED DESCRIPTION OF THE PREFERRED EMBODIMENT

Referring to FIGS. 1 and 2 of the drawings, a torque transmitting device 20 incorporates a friction bracket assembly 22. In a preferred embodiment, torque transmitting device 20 is a friction clutch that selectively transmits torque from an engine flywheel 24 to a drive shaft 26 of the vehicle transmission (not shown). Flywheel 24 is the driving member for transmitting torque to drive shaft 26, which extends about an axis A—A.

Fixed to flywheel 24 for rotation therewith is a housing 28, also referred to as a cover. A pressure plate 30 and a driven plate 32 are interposed between flywheel 24 and housing 28. These clutch members rotate about axis A—A. Pressure plate 30 is coupled to housing 28 to accommodate axial, but non-rotatable movement with respect to the housing. Driven plate 32 is coupled to drive shaft 26 to accommodate axial, but non-rotatable movement with respect to the drive shaft.

Friction bracket assembly 22 comprises a forward bracket 34 and a rearward bracket 36. Forward bracket 34 is in proximity to housing 28, as shown to the right in FIG. 2. Rearward bracket 36 is in proximity to the engine flywheel 24, as shown to the left in FIG. 2. Brackets 34 and 36 extend radially about drive shaft 26 for only a limited circumferential extent, and may thereby be removed without disassembly of torque transmitting device 20. Brackets 34 and 36 are secured by at least one dowel 38, and preferably by a pair of dowels 38. Dowels 38 extend through apertures in the brackets. The brackets and dowels are accessible from outside the torque transmitting device 20 to facilitate removal of the brackets.

Dowels 38 extend from an outer periphery of driving member 24. Forward bracket 34 includes an aperture 40 for each dowel 38, and rearward bracket 36 includes an aperture 42 for each dowel. Forward bracket 34 and rearward bracket 36 slide along the axial dimension of dowels 38. Brackets 34 and 36 are thereby secured to flywheel 24 and housing 28 for rotation with the flywheel 24 and housing 28. Dowels 38 are circumferentially spaced about drive shaft 26, and rigidly secured to flywheel 24. Each dowel 38 is positioned radially outwardly of driven plate 32 so that driven plate 32 may rotate freely with drive shaft 26.

Brackets 34 and 36 each include a guide member, such as flanges 44 and 46, respectively, that cooperate with another member of the torque device 20 in order to provide stability and additional support during axial movement of the brackets. More specifically, flange 44 of forward bracket 34 cooperates with housing 28, and flange 46 of rearward bracket 36 cooperates with forward bracket 34.

In a preferred embodiment, a plurality of pairs of forward brackets 34 and rearward brackets 36 may be secured between the flywheel and the housing at various circumferential positions about the drive shaft. In one known embodiment, four pairs of brackets are used, each pair of brackets being spaced about the drive shaft 90° from each other.

Dowel 38 is generally cylindrical having a substantially circular cross-section. Dowel 38 includes a tip 48, a central portion 50 and a head 52. Tip 48 of dowel 38, shown as the leftward most portion in FIG. 2, is threaded and received in a threaded bore 54 in flywheel 24. Head 52, shown as the rightward most portion in FIG. 2, has a diameter greater than a diameter of central portion 50. Dowel 38 extends through an aperture 56 in housing 28, aperture 40 in forward bracket 34, and aperture 42 in rearward bracket 36. The diameter of head 52 of dowel 38 is greater than aperture 56 in housing 28 to prevent removal of housing 28 from the dowel. The diameter of central portion 50 of dowel 38 is slightly less than a diameter of aperture 40 in forward bracket 34, and aperture 42 in rearward bracket 36. Central portion 50 has a substantially smooth surface. This structural arrangement allows forward bracket 34 and rearward bracket 36 to slide axially with respect to dowel 38 between flywheel 24 and housing 28.

If the apertures of the brackets are in close tolerance with the diameter of central portion 50 of dowel 38, the brackets remain relatively stable during axial movement of the brackets. With this arrangement, however, the brackets may bind as the brackets move along the dowels. As the tolerance provided between the apertures of the brackets and the diameter of the dowel is increased, the stability of the brackets is decreased during axial movement of the brackets. The guide members, which are flanges 44 and 46, provide additional stability for the brackets.

Referring now to FIGS. 2 and 3, head 52 of dowel 38 includes a plurality of flats 58 to accommodate assembly, so that dowel 38 may be rotated and threadably received within bore 54 of flywheel 24. A lock washer 60 is interposed between housing 28 and head 52 of dowel 38. Lock washer 60 includes a body 62 and an anti-rotation tab 64. Prior to assembly, body 62 and tab 64 of lock washer 60 extend in the same plane, as shown in FIG. 3. After assembly, tab 64 is moved to extend perpendicular with respect to body 62, as shown in FIG. 2. When so moved, tab 64 aligns with one of the flats 58 to prevent rotation of lock washer 60 and dowel 38.

Forward bracket 34 is interposed between pressure plate 30 and driven plate 32. Rearward bracket 36 is interposed between driven plate 32 and flywheel 24. Forward bracket 34 includes a generally planar base plate 66 that extends in a plane generally perpendicular to axis A—A. Flange 44 extends from a radially outer end 67 of base plate 66. Flange 44 extends outwardly from, and generally perpendicular to base plate 66, intersecting base plate 66 along a line X—X, shown in FIG. 3. Flange 44 extends an axial distance sufficient to cooperate with, and slide along an outer circumferential edge 68 of housing 28. Flange 44 contacts housing 28 at two circumferentially spaced locations, shown at 70 in FIG. 1. A friction surface is provided on each axial side of base plate 62. More specifically, a friction pad 72 provides the friction surface for pressure plate 30, and a friction pad 73 provides the friction surface for driven plate 32.

Housing 28 does not move relative to bracket 34, and serves as a stabilizing structure for the bracket. By cooperating with housing 28, base plate 66 of bracket 34 maintains a relatively planar orientation with respect to the engaging surface of driven plate 32.

Rearward bracket 36 includes structure similar to the forward bracket, as described above. Rearward bracket 36 includes a generally planar base plate 74 that extends in a plane generally perpendicular to axis A—A. Flange 46 extends from a radially outer end 75 of base plate 74. Flange 46 extends outwardly from, and generally perpendicular to base plate 74, intersecting base plate 74 along a line Y—Y, as seen in FIG. 3. Flange 46 extends an axial distance sufficient to cooperate with, and slide along an outer circumferential edge 76 of flange 46 of forward bracket 34. A friction surface is provided on each axial side of base plate 72. More specifically, a friction pad 78 provides the friction surface for driven plate 32, and a friction pad 79 provides the friction surface for flywheel 24.

Rearward bracket 36 cooperates with forward bracket 34 so that rearward bracket 36 is indirectly supported by housing 28. Specifically, flange 46 of rearward bracket 36 cooperates with flange 44 of forward bracket 34. In this manner, base plate 72 of rearward bracket 36 maintains a relatively planar orientation with respect to the engaging surface of driven plate 32. To achieve this, radially outer end 75 of rearward bracket 36 extends radially greater than radially outer end 67 of forward bracket 34.

Flanges 44 and 46 function as a guide structure during axial movement of the brackets, providing additional support. Flanges 44 and 46 assure proper alignment of the brackets in order to maintain stability, and provide for smoother operation as the torque transmitting device in engaged and disengaged. Although the flanges are disclosed as generally flat, the flanges may be dimensioned and shaped in any manner so long as additional the flanges slide along a support structure during axial movement of the brackets.

As will be apparent to those skilled in the art, leftward movement of pressure plate 30 results in frictional engagement of forward bracket 34, driven plate 32, rearward bracket 36, and flywheel 24. When engaged in this manner, these elements of the clutch rotate together transmitting the rotation of flywheel 24 to drive shaft 26, through driven plate 32.

A standard clutch release mechanism is employed for effecting clutch disengagement. The release mechanism allows for rightward movement of the pressure plate. Such movement is generally achieved by the depression of a clutch pedal in a vehicle cab.

If additional driven plates, or other intermediate plates, are included in a torque transmitting device, a third or fourth bracket of similar structure, as described above, may be required. In some applications, where the torque transmitting device is under less load, only one bracket may be necessary.

Although only one preferred embodiment has been detailed and described herein, the following claims envision a number of other alternatives which may fall within the spirit and scope of the invention.

What is claimed is:

1. In a friction torque device of the type having a driving member and a housing, wherein a pressure plate and a driven member are sandwiched between the housing and the driving member rotating about an axis, the friction torque device further comprising:

plurality of first brackets circumferentially distributed about the axis each bracket including a generally planar base plate, said base plate of said bracket having a friction surface adapted to contact the driven member;

a plurality of dowels fixed to the driving member at an outer periphery thereof with the brackets slidably disposed on an associated one of the dowels, the dowels thereby providing axial and non-rotatable movement of the brackets relative to the driving member;

a guide member coupled to said base plate of said bracket, said guide member adapted to cooperate with a member of the friction torque device for maintaining a substantially planar orientation of said base plate with respect to an engaging surface of the driven member during axial movement of said base plate;

a plurality of second brackets circumferentially distributed about the axis, each second bracket including a generally planar second base plate, said second base plate having a friction surface adapted to contact the driven member and being slidably disposed on an associated one of the dowels, the dowels thereby providing axial and non-rotatable movement relative to the driving member; and a second guide member coupled to said base plate of said second bracket, said guide member adapted to cooperate with said first bracket for maintaining a substantially planar orientation of said second base plate with respect to the engaging surface of the driven member during axial movement of said second base plate.

2. The friction torque device as recited in claim 1, wherein said second guide member extends radially outwardly of said first bracket.

3. A friction torque device comprising:

a driving member;

a housing coupled to said driving member for rotation with said driving member;

a pressure plate interposed between said driving member and said housing, said pressure plate coupled to said housing for axial and non-rotational movement relative to said housing;

a driven member interposed between said driving member and said pressure plate, said driven member being rotationally coupled to a driven shaft, said driven shaft rotating about an axis;

a dowel rigidly secured to said driving member and coupled to said housing, said dowel extending from said driving member radially outwardly of said driven member;

a plurality of first brackets circumferentially distributed about the axis and coupled to said dowel for axial movement with respect to said, driving member, said first brackets each having a first base plate interposed between said driven member and said pressure plate, said first base plate having a friction surface adapted for frictional contact with said driven member, said first brackets each including a first guide member engaging one of the driver and the housing for maintaining the relative orientation of said first base plate during axial movement of said first bracket; and a plurality of second brackets circumferentially distributed about the axis and coupled to said dowel for axial movement with respect to said driving member, said second brackets each having a second base plate interposed between said driven member and said driving member, said second base plate having a friction surface adapted for frictional contact with said driven member, said second brackets each including a second guide member engaging the first bracket for maintaining the relative orientation of said second base plate during axial movement of said second bracket.

4. The friction torque device of claim 3, wherein said first guide member is a first flange extending perpendicularly from said first base plate, said first flange extending from a radially outer portion of said first bracket and having a radially inner surface contacting a radially outer surface of said housing.

5. The friction torque device of claim 3, wherein said second guide member is a second flange extending perpendicularly from said second base plate, said second flange extending from a radially outer portion of said second bracket and having a radially inner surface contacting a radially outer surface of said first flange, said second flange extending a greater radial distance than said first flange.

* * * * *